Jan. 1, 1963  C. P. DE BIASI  3,071,382
MATERIAL SPREADER FOR USE ON A DUMP TRUCK
Filed June 26, 1959  6 Sheets-Sheet 1

Charles P. De Biasi
INVENTOR.

BY *Clarence A. O'Brien*
*and Harvey B. Jacobson*
Attorneys

Jan. 1, 1963 C. P. DE BIASI 3,071,382
MATERIAL SPREADER FOR USE ON A DUMP TRUCK
Filed June 26, 1959 6 Sheets-Sheet 5

Charles P. De Biasi
INVENTOR.

United States Patent Office 3,071,382
Patented Jan. 1, 1963

3,071,382
MATERIAL SPREADER FOR USE ON A
DUMP TRUCK
Charles P. De Biasi, 74 Braman Road, Waterford, Conn.
Filed June 26, 1959, Ser. No. 823,060
7 Claims. (Cl. 275—8)

The present invention generally relates to a material spreader and more particularly to such a spreader for attachment to a load carrying vehicle such as a dump truck although the device is not limited in its utility to a dump truck since it may be employed with various types of trucks having various types of load carrying bodies.

In many instances, material such as sand, gravel, salt and other pulverulent material are spread from a moving vehicle whereby the rate of spreading may be controlled and the spreader is attached to the load carrying body of the vehicle or otherwise associated therewith for spreading the material over the ground surface or the like. With this in mind, it is the primary object of the present invention to provide an improved and novel spreader assembly for attachment to a load carrying vehicle body such as a dump truck body and which includes a spinner plate rotatable about substantially a vertical axis which will broadcast material deposited onto the spinner plate into a predetermined path.

Another object of the present invention is to provide a spreader for attachment to a dump truck body which spreader is freely pivotal about a transverse axis whereby the spinning plate of the spreader will be maintained in a generally horizontal plane for rotation about a vertical axis.

A further object of the present invention is to provide a material spreader in which the spreader is provided with an adjustable feature for varying the rate of discharge of material by a spinner plate by varying the relationship of the discharge housing to the spinner plate.

Another object of the present invention is to provide a material spreader in accordance with the preceding objects in which the spinner plate is of a reversible character in that fins are provided on both the upper and lower surface thereof with the fins having different characteristics so that the characteristics of the spreader may be varied by inverting the spinner plate.

Yet another important object of the present invention is to provide a material spreader in which a spinner plate is disposed at the lower end of a housing and a portion of the housing adjacent the plate is divided into segments that are pivotally supported and spring biased to a vertical position but which will move outwardly in the event of engagement by a lump or the like thus permitting elimination of such lumps.

Another important feature of the present invention is to provide a material spreader including a rotatable spreader plate driven by a hydraulic motor whereby the speed of the plate and the velocity of discharge of the material may be altered by altering the speed of the hydraulic motor by a control valve.

Still another important feature of this invention is to provide a material spreader mounted at the forward corner of a load carrying body together with a device for pushing the material into the spreader for discharge of the material laterally of the vehicle.

A still further important feature of the present invention is to provide a material spreader in which the spreader is suspended by a spring device which has incorporated therewith a signal which will signal to the operater of the vehicle that the material spreader is empty thus permitting the operator to provide more material for the spreader or otherwise cease the operation thereof.

Another particular feature of the present invention is to provide a material spreader having a controlled rate of discharge with the rate of discharge being variable by a hydraulic system operable by an operator which in conjunction with the signal system and the material loading device disposed within the vehicle body will all accurately control the rate of discharge of material from the material spreader.

Another salient feature of the present invention is to provide a material spreader having a spinner with an upstanding flange on the outer edge thereof for assuring that the material discharged centrifugally therefrom will reach a relatively high speed before it is discharged thereby assuring a relatively wide path of distribution of the material.

Other objects of the present invention will reside in its ease of attachment to load carrying vehicle bodies, ease of operation, control, and adjustment, efficiency in operation and relatively trouble free operation of long duration.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
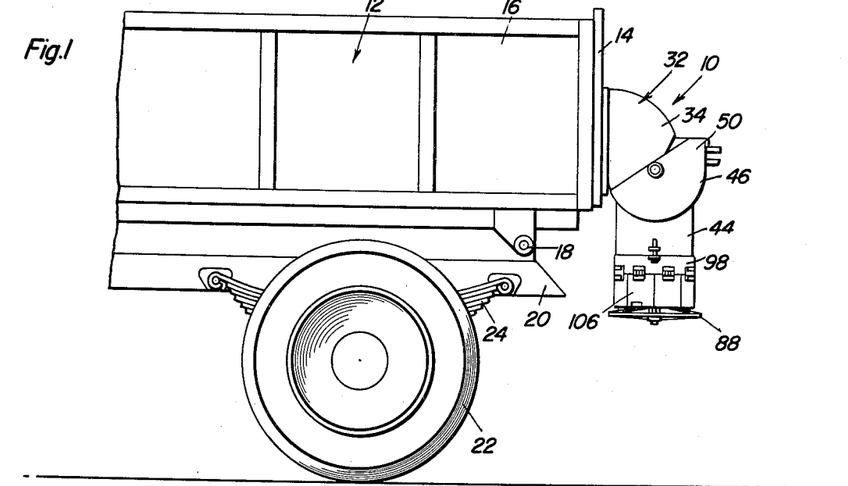
FIGURE 1 is a partial side elevational view of a dump truck body with the material spreader of the present invention attached thereto.
Figure 2:
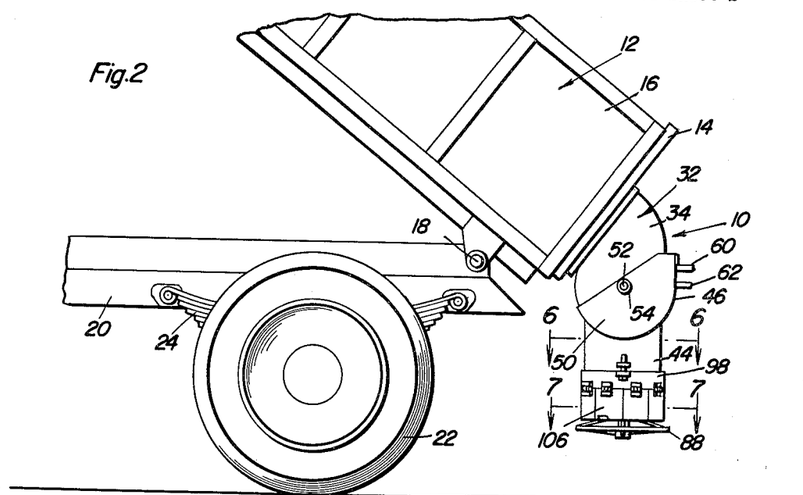
FIGURE 2 is an elevational view similar to FIGURE 1 but with the dump body in elevated or dumping position and illustrating the position of the spreader when the dump body is in dumping position.

Referring now specifically to FIGURES 1–8 of the drawings, the numeral 10 generally designates the material spreader of the present invention which is attached to a dumpable vehicle truck body generally designated by the numeral 12 which includes the usual tailgate 14, side walls 16, pivot members 18, supporting frame rails 20, rear driving wheels 22, springs 24 and other structural features normally found in a dump body equipped vehicle. As illustrated in FIGURE 2, the body 12 is pivotal about the pivot axis 18 so that the forward end thereof is elevated for dumping material normally from the body 12 by virtue of opening the tailgate 14. In this construction, the tailgate 14 is stationary and is provided with vertically extending trackway forming members 28 on either side of an opening formed in the tailgate. The vertical trackways receive outturned flanges 30 on a support or adapter generally designated by the numeral 32 and including parallel side walls 34, an arcuate top wall 36 and an arcuate lower wall 38. The arcuate top wall 36 does not extend throughout the length of the top edges of the side walls 30 and the portions of the top edges extending beyond the top wall 36 are designated by the numeral 40 and are arcuate and form continuations of the top wall 36.

Figure 5:
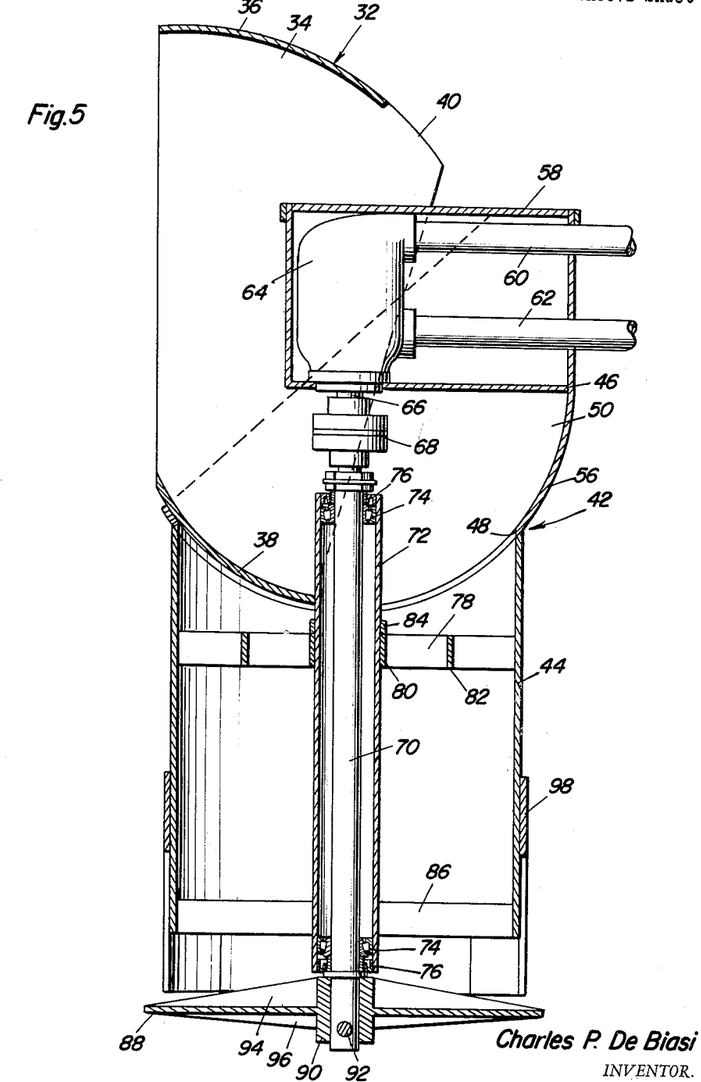
FIGURE 5 is a longitudinal, vertical sectional view, on an enlarged scale, taken substantially upon a plane passing along section line 5—5 of FIGURE 3 illustrating structural details of the material spreader including the housing, the supporting mechanism and the driving mechanism for the spinner plate.

Supported from the adapter 32 is a housing generally designated by the numeral 42 which includes a depending cylindrical tubular member or housing 44 rigidly affixed to a polygonal adapter 46 at the upper end thereof which has an enlarged opening 48 communicating with the interior of the depending tubular housing 44. The adapter 46 is provided with side walls 50 that are disposed exteriorly of the side walls 34 and are hingedly connected thereto by virtue of hinge pins 52 which extend through bearings 54 connected with the side walls 50. Thus, the housing assembly 42 may pivot freely about the hinge pins 52 which form a transverse axis of pivotal movement for the housing assembly 42 with the weight of the housing assembly 42 serving to maintain the tubular housing 44 in substantially a vertical position. The lower portion of the adapter 46 is arcuated as indicated by the numeral 56 for sliding engagement with the arcuate lower wall 38 of the adapter 32 for sealingly engaging the same and providing a communication between the adapter 32 and the depending tubular housing 44 with the communication being continuous even when the dump body 12 is elevated to dumping position. FIGURE 5 illustrates the orientation of structure when the dump body 12 is in a horizontal position and when the dump body 12 is elevated, the arcuate edges 40 and the arcuate top wall 36 are received within the upper end portion of the adapter 46 and will actually engage the arcuate lower wall 56 of the adapter 46 in certain instances but the pivot movement of the adapter 46 in relation to the adapter 32 is limited by an inwardly extending housing 58 for hydraulic pressure conduits 60 and 62 which are connected with a hydraulic motor 64 disposed within the housing 58. The housing 58 may be complete thus sealing the motor from any sand or other material being spread or the housing 58 may be in the form of space straps or brackets.

The hydraulic motor 68 is provided with an output shaft 66 connected with a coupling 68 having an elongated drive shaft 70 secured thereto. The drive shaft 70 extends through an elongated tubular sleeve or housing 72 in concentric relation thereto and is journaled at each end by roller bearing assemblies 74 and exteriorly of each roller bearing assembly 74 there is provided a seal assembly 76 to prevent sand or other material from coming into contact with the bearings. Any suitable lubrication may be provided for the bearings or the bearings may be of the sealed and packed type.

The elongated cylindrical sleeve or housing 72 is supported in concentric relation to the depending tubular housing 44 by a plurality of radially extending braces 78 which extend from a collar 80 on the sleeve 72 and engage and are secured to the inner surface of the depending tubular housing 44. For rigidifying and reinforcing the braces 78, an annular ring 82 is provided which is connected to the radial braces 78 intermediate the sleeve 72 and the tubular housing 44. The braces 78, collar 80 and annular collar or ring 82 are all welded in position and a collar 84 is disposed above the collar 80 and is fixed to the sleeve 72.

The lower end of the sleeve 72 is retained in concentric relation to the tubular housing 44 by a plurality of radially extending support braces 86 which are fixed to the sleeve 72 and the tubular housing 44.

Figures 3, 8:
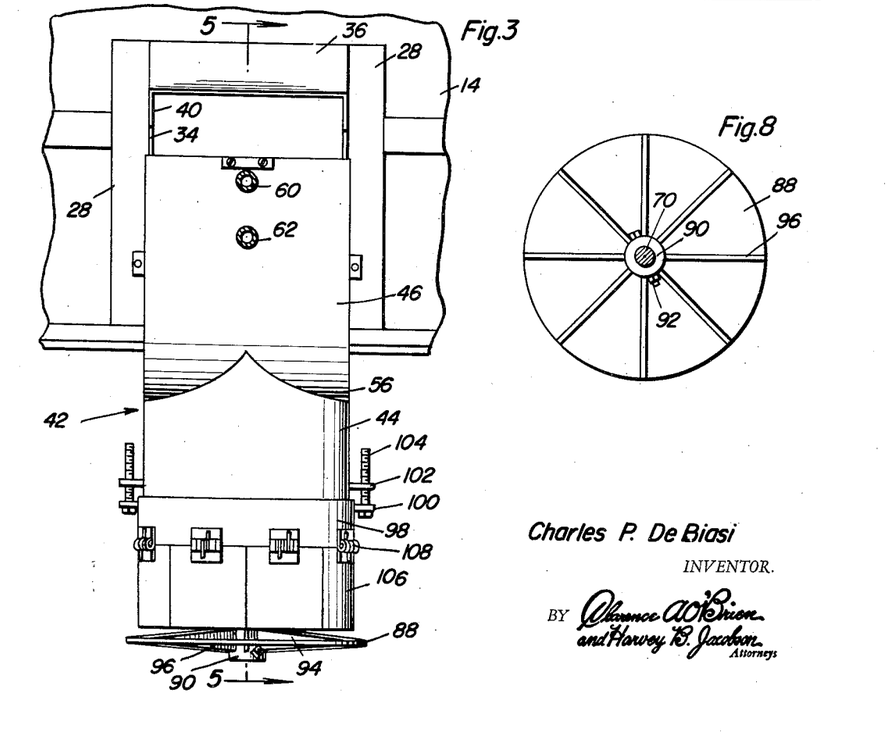
FIGURE 3 is a rear elevational view of the material spreader on an enlarged scale and illustrating the structural relationship of the material spreader to the dump body.
FIGURE 8 is a bottom plan view of the spinner plate illustrating the ribs on the bottom thereof which may be employed when the spinner plate is inverted.
Figure 4:
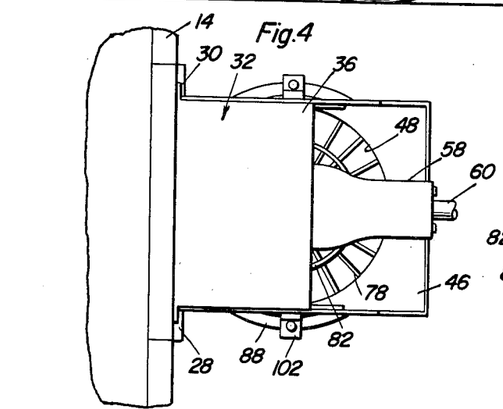
FIGURE 4 is a top plan view of the construction of FIGURE 3.

The lower end of the drive shaft 70 is provided with a circular spinner plate 88 having a hub 90 removably mounted on the lower end of the shaft 70 and retained removably in position by a removable fastener 92. The upper surface of the plate 88 is provided with a plurality of radially extending ribs 94 which taper outwardly from the upper end of the hub 90 to the outer edge of the plate 88. The lower surface of the plate 88 is provided with radially extending ribs 96 which have considerably less height than the ribs 94. This will be clearly seen in FIGURE 5 where the depth of the rib 96 is approximately one-half the depth of the ribs 94. Thus, by removing the fastener 92 and the spinner plate 88 and inverting the spinner plate 88, the characteristics of discharge of material of the spinner plate 88 may be varied thereby providing a flexibility in use of the device since the same spinner plate may be used with entirely different materials.

For controlling the rate of discharge of the material during rotation of the spinner plate 88, a control sleeve 98 is disposed in encircling relation to the lower end of the tubular housing 44 for vertical sliding movement thereon. The lower end of the control sleeve 98 extends below the bottom end of the tubular housing 44 which is coincidental wtih the lower edges of the radial braces 86. For moving the sleeve 98, the sleeve 98 is provided with diametrically opposed lugs 100 in alignment with a pair of diametrically opposed lugs 102 on the tubular housing 44. A threaded member 104 extends through the lug 100 and is threaded through the lug 102 whereby rotation of the threaded member 104 by engaging a suitable wrench with the polygonal head of the threaded member 104 will raise or lower the control sleeve 98 for varying the relationship or space between the surface of the spinner plate 88 and the lower edge of the sleeve 98 thereby controlling the rate of discharge of material centrifugally or radially of the spinner plate 88.

Figure 7:
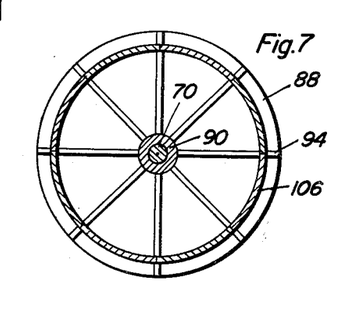
FIGURE 7 is a transverse, plan sectional view taken substantially upon a plane passing along section line 7—7 of FIGURE 2 illustrating the construction of the segmental lump eliminating plates and the construction of the spinner plate.

The lower portion of the control sleeve 98 is constructed of a plurality of segmental plates or gates 106 each of which is arcuate and which collectively form a cylinder and continuation of the sleeve 98. Each of the arcuate gates or plates 106 is connected to the upper portion of the sleeve 98 by a spring biased hinge assembly 108 which normally maintains the gates 106 in alignment with the upper portion of the sleeve 98 but which will permit the gates 106 to swing outwardly in the event that a relatively large lump of material passes downwardly through the tubular housing 44 and engaging the ribs 94 wherein the ribs 94 will throw the lump of material outwardly and the centrifugal force will cause the gate or gates 106 engaged thereby to swing outwardly thus permitting the lump to be eliminated from the tubular housing 44. After passage of the lump, the spring biased hinge 108 will return the gate 106 to its normal position in defining a portion of the cylindrical sleeve 98.

The spreader is attached to the tailgate by a simple vertical sliding action and when it is desired to lift the material spreader off of the tailgate, it is a relatively simple operation and the tailgate opening may then be closed by a plate similar in size to the entrance end of the adapter 32. The shaft 70 will always be maintained vertical due to its free swinging or hanging supporting structure and it is pointed out that the plate 88 is slightly larger than the tubular housing and the control sleeve 98 for assuring that all material discharged from the housing 44 will engage and be spread by the spinner plate 88.

Figure 6:
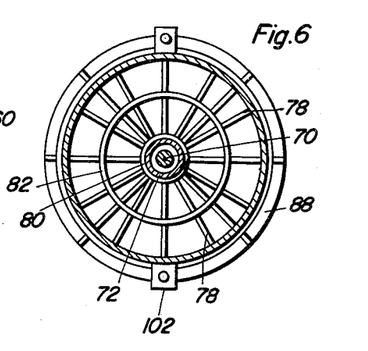
FIGURE 6 is a transverse, plan sectional view taken substantially upon a plane passing along section line 6—6 of FIGURE 2 illustrating the structural details of the housing and the support members for the drive shaft of the spinner plate.

The radial braces 78, as seen in FIGURE 6, together with the ring member 82 coact to form somewhat of a screen to restrict the size of stones or lumps that may reach the spinner. By mounting either the shaft or the spinner plate slightly eccentric to provide for vibration, the screen formed by the members 78 and 82 will form a vibrating screen. Also, radially curved fins may be provided on the spinner plate for more expeditious spreading of certain materials.

Referring now specifically to FIGURES 9–13 the numeral 110 generally designates another form of material spreader which is attached to the forward left or forward right portion of a load carrying vehicle body generally designated by the numeral 112 with the vehicle including the usual cab 114, steerable front wheels 116, rear driving wheels 118 and other control mechanisms. The body 112 need not be of the dumpable type and is provided with an opening 120 in the bottom 122 which opening has a pair of horizontal angle iron trackway members 124 thereon for slidably and detachably receiving projecting flanges 126 on a stationary tubular sleeve 128 which slidingly receives a movable tubular sleeve or housing 130 which is equivalent to the housing 44 in the device of FIGURES 1–8.

Figure 11:
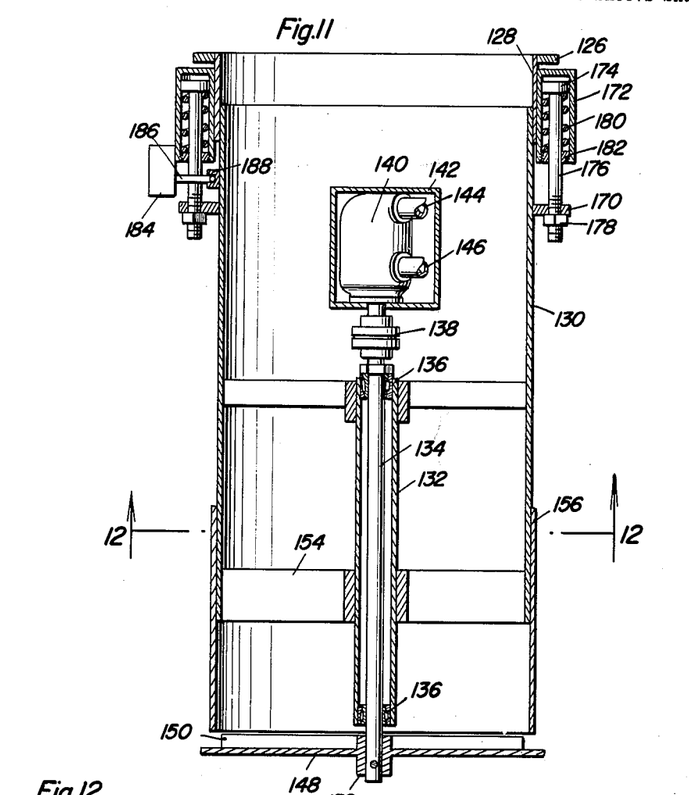
FIGURE 11 is a longitudinal, vertical sectional view of the spreader of FIGURE 9 illustrating the structural details of the spreader and also the signal mechanism for indicating the absence or presence of a predetermined quantity of material in the spreader.
Figure 12:
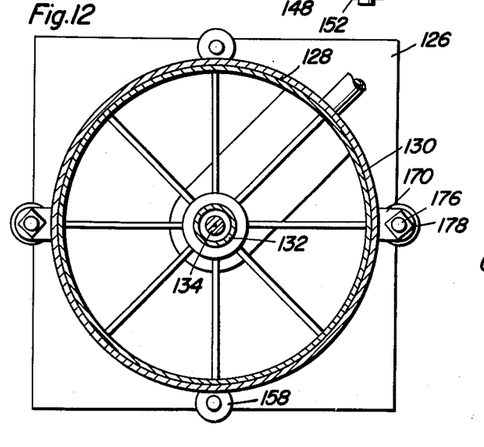
FIGURE 12 is a transverse sectional view taken substantially upon a plane passing along section line 12—12 of FIGURE 11 illustrating further structural details of the spreader.

The tubular housing 130 is provided with a concentric tubular sleeve 132 therein receiving a drive shaft 134 in concentric relation thereto with the drive shaft having a bearing and seal assembly 136 at the upper and lower end thereof for rotatably supporting the shaft 134. The shaft 134 is provided with a coupling 138 at the upper end thereof connected to a hydraulic motor 140 which is disposed in a housing 142 which extends radially of the housing 130 and which receives hydraulic conduits 144 and 146. The lower end of the shaft 134 is provided with a spinner plate 148 which is circular in configuration and slightly larger in diameter than the housing 130. The spinner plate 148 is provided with radial fins 150 on the upper surface thereof and the spinner plate 148 is provided with a central hub 152 secured to the lower end of the shaft 134. Also, the lower end of the housing 130 is spaced from the sleeve 132 by radial braces 154 thus rigidly supporting the sleeve 132 in the housing 130.

Figure 13:
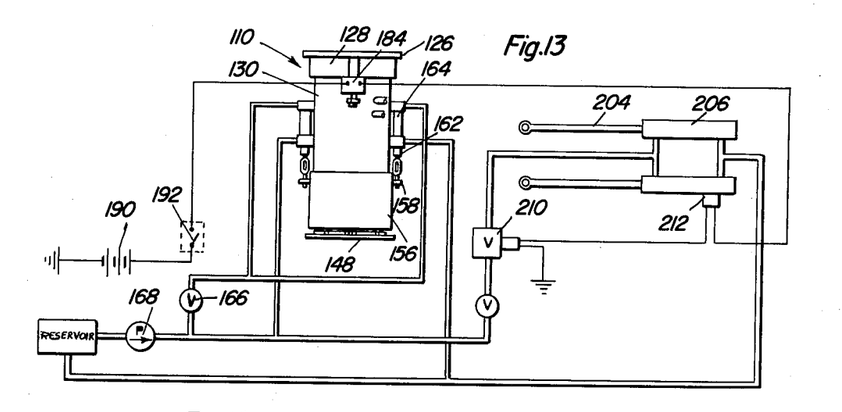
FIGURE 13 is a schematic view of the spreader and the hydraulic and electrical control mechanism for controlling the rate of discharge from the spreader, controlling the movement of material into the spreader all of which is operated by an operator in the cab of the vehicle.

Slidably mounted on the lower end of the cylindrical housing 130 is a cylindrical control sleeve 156 having the lower end terminating in adjustable spaced relation to the spinner plate 148 for controlling the rate of discharge of material from the spinner plate 148 by varying the space between the lower end of the sleeve 146 and the spinner plate 148. The sleeve 156 is provided with diametrically opposed projecting lugs 158 thereon to which is attached turnbuckle assemblies 160 with the upper end of the turnbuckle assemblies 160 being connected to the piston rod 162 of a piston received within a hydraulic cylinder 164 whereby the double acting piston and cylinder arrangement including the piston rod 162, piston and cylinder 164 on each side of the housing 130 to which it is anchored will raise and lower the control sleeve 156 by virtue of a control valve 166 which may be located in the operator's cab 114 and which will communicate the cylinder 164 with fluid pressure from a pump 168 with the valve 166 controlling input to the upper end of the cylinder 164 for balancing the pressure communicated with the lower end of the cylinder 164 for varying the degree of closing or opening of the sleeve 156.

The housing 130 is provided with a pair of diametrically opposed lugs 170 which are in alignment with cylinders 172 rigidly affixed to the sleeve 128. The cylinder 172 receives a piston 174 which has a piston rod 176 extending downwardly therefrom and extending through the lug 170 with a nut 178 being mounted on the lower threaded end of the piston rod 176 for adjusting the effective length of the piston rod 176. A compression coil spring 180 is disposed in the cylinder 172 and is provided with one end abuttingly engaging the piston 174 and the other end abuttingly engaging a closure plug 182 for the lower end of the cylinder 172 which slidingly receives the piston rod 176 and does not form an effective seal for permitting movement of the piston 174 and the cylinder 172 without any actual retarding effect from any entrapped air whereby the weight of the material within the housing 130 and sleeve 156 will cause compression of or permit expansion of the spring 180.

One of the cylinders 172 is provided with a switch member 184 having an actuating arm 186 extending inwardly and engaged with a notched lug 188 rigidly affixed to the tubular housing 130. Thus, as the relative elevational relationship changes between sleeve 128 and tubular housing 130, the switch arm 186 will be moved for opening and closing the switch 184. The switch 184 is connected to a source of electrical energy such as the battery 190 of the vehicle and of course this switch may be rendered inoperative by a manual switch 192. The switch 184 automatically controls operation of a mechanism for filling the tubular housing 130 when it becomes empty. Thus, as the housing 130 becomes empty of material, the springs 180 will expand thus closing the switch 184 and actuating the loading mechanism for the housing 130.

Figure 9:
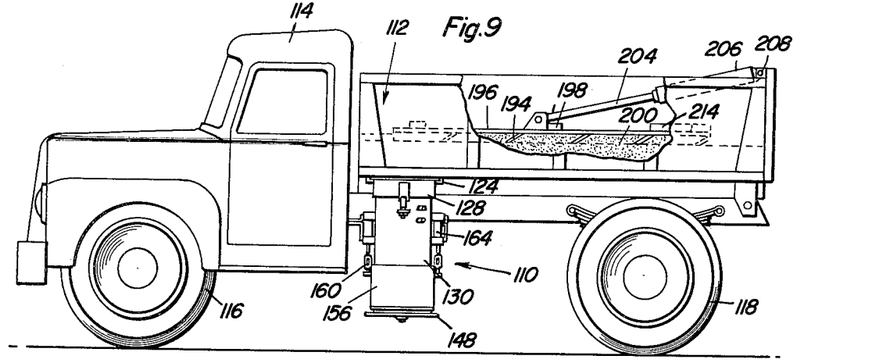
FIGURE 9 is a side elevational view of a dump truck or stationary body load carrying vehicle illustrating the material spreader disposed at the forward corner thereof with portions of the body broken away illustrating the mechanism for pushing or conveying the material in the load carrying body to the forward left corner of the body for discharge into the material spreader.
Figures 10, 17:
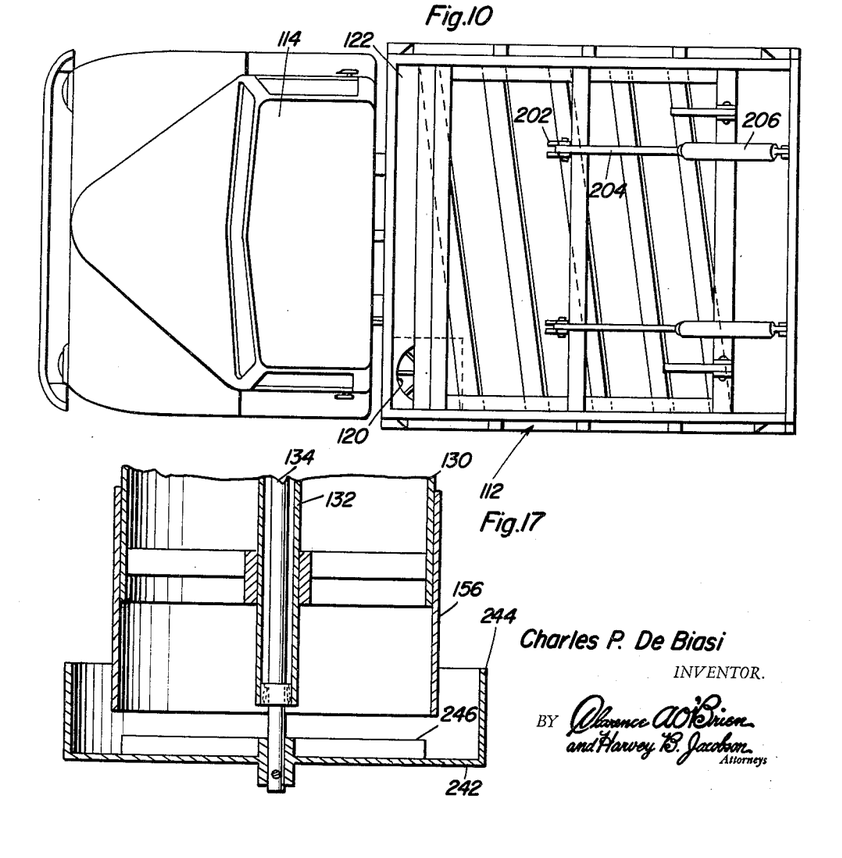
FIGURE 10 is a plan view of the construction of FIGURE 9.
FIGURE 17 is a sectional view of the lower end of the material spreader having a spinner plate thereon in which the spinner plate is provided with a peripheral flange for providing an obstacle to material being thrown centrifugally by the spinner plate thereby assuring that the material thrown by the spinner plate will have substantial centrifugal force for spreading over a relatively large area.

The mechanism for loading the tubular housing 130 includes a plurality of transversely extending inclined blades 194 that are rigidly carried by longitudinal frame elements 196 which are reinforced by transverse frame elements 198. The blade members 194 are inclined downwardly and forwardly and are adapted to engage the material being discharged such as sand or the like designated by the numeral 200. Also, the blades 194 are transversely inclined as illustrated in FIGURE 10. That is, the end of the blades 194 on the same side as the opening 120 will be disposed rearwardly of the other ends of the blades 194. By positioning the opening 120 on the other side of the load carrying body, the blades 194 would be inclined in the other lateral direction.

Adjacent the center of the blade assembly, there are provided two pairs of upstanding lugs 202 pivotally attached to the outer ends of piston rods 204 received in cylinders 206 which are anchored at their rear ends to the tailgate or rear transverse member by pivot pins 208. By alternately expanding and contracting the piston and cylinder assemblies defined by the cylinders 206, the pistons rods 204 and the pistons on the inner ends thereof, the blade assembly may be caused to reciprocate in the vehicle body 112 thereby moving material 200 forwardly and also moving material laterally of the vehicle body 112 into the opening 120. Thus, as the switch 184 is closed, a solenoid control valve 210 is opened and a reversing valve 212 is also operated for alternating the expansion and contraction of the piston and cylinder assemblies automatically for automatically reciprocating the blade assembly for filling the tubular housing 130 until the combined weight of the housing 130 and the sand or material 200 therein will move the housing 130 downwardly and compress the springs 180 to a point where the switch arm 186 will open the switch 184 whereupon the solenoid valve 210 will be closed and the reversing valve 212 will cease operation.

With this form of the invention, the degree of opening of the control sleeve 156 may be varied by the manually controlled valve 166. The material in the housing 130 is controlled automatically by the switch device 184 and the piston and cylinder arrangements for reciprocating the blades 194.

When it is desired to elevate the blade assembly for filling the vehicle body, pivotal props 214 may be extended rearwardly into engagement with the corner of the tailgate and bottom of the body and the piston and cylinder assemblies contracted thus elevating the forward portion of the blade assembly. Then, laterally extending elements may be extended and engaged with the top edges of the side walls of the vehicle body whereupon the entire blade assemblies may be raised to the upper edge of the side walls since the laterally extending elements may be in the form of rollers and may be disposed rearwardly of the transverse center of gravity of the blade assembly. When the blade assembly is elevated, the material may be dumped into the body through the frame elements of the blade assembly and of course, the props 214 are pivoted into overlying relation to the frame rails 196 when they are not being used.

In this form of the invention, the turnbuckles 160 are used for fine adjustments between the spinner plate and the adjustable tube or sleeve. When a lump or stone gets into the housing and engages the spinner, the truck driver can, by opening a valve, cause the cylinders to raise the adjustable sleeve 156 approximately six inches so that the lump or stone may be eliminated without stopping or getting out of the truck and the operation may of course then return the adjustable sleeve back to its desired position near the spinner. The hydraulic motor for driving the unit is on an independent hydraulic circuit and is controlled by a needle valve located in the truck cab. Thus, the driver of the truck can achieve any spreading velocity he desires by adjusting the needle valve without any effect on the other components of the device. When the driver turns on the switch 192, the blade assembly will automatically fill the spreader if the spreader is empty since the limit switch 184 will be turned on and current will flow through the solenoid valve which will open the hydraulic valve and the reciprocating cylinder motors will operate thus feeding material to the spreader. When the spreader has enough material to satisfy the springs and the limit switch, the limit switch will open which in turn will cause the solenoid to close the hydraulic valve and of course cease operation of the reciprocating cylinder motors. When the truck becomes empty, the driver will open the electric switch 192 in the cab and operate the solenoid valve by hand for raising the blade assembly to loading position.

Figure 14:
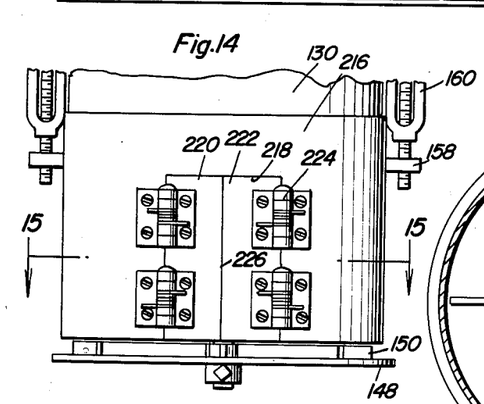
FIGURE 14 is a partial side elevation of the spreader illustrating another form of lump eliminator mechanism.
Figure 15:
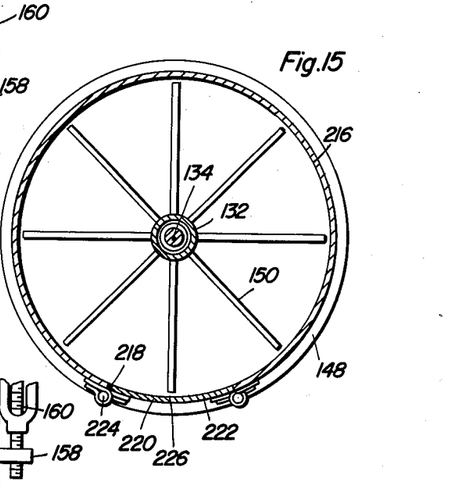
FIGURE 15 is a transverse, plan sectional view taken substantially upon a plane passing along section line 15—15 of FIGURE 14 illustrating further structural details of this form of the lump eliminator.

Referring now specifically to FIGURES 14 and 15, another form of the invention is illustrated which is substantially the same as that form shown in FIGURES 9-13 with the only modification being in the control sleeve which is designated by the numeral 216 and which is associated with the tubular housing 130 in the same manner as the tubular sleeve 156 is associated with the housing 130 in the device of FIGURES 9-13. The control sleeve 216 is provided with a generally rectangular opening 218 therein which extends from the bottom edge of the sleeve 216 to a point spaced from the top edge thereof. Mounted in the opening 218 and forming a closure therefor are two closure doors 220 and 222 with the closure doors being mounted on the sleeve 216 by spring biased hinge members 224 which will permit the doors 220 and 222 to swing outwardly from the meeting edges 226 and which will resiliently bias the doors 220 and 222 back to their closed position. The doors 220 and 222 are arcuate and form a continuation of the control sleeve 216 as clearly illustrated in FIGURE 15 with the interior surface of the sleeve 216 being substantially continuous when the doors 220 and 222 are closed. Thus, when the lump or stone engages the spinner 148 and the ribs 150 thereon, the centrifugal force exerted on the lump or stone will cause the doors 220 and 222 to swing outwardly somewhat in the nature of a pair of barn doors against the spring bias of the spring hinges 224 thus permitting elimination or exit of the stone or lump and after the stone or lump has passed outwardly of the sleeve 216, the doors 220 and 222 will be automatically swung back to closed position by the spring hinges 224. Other than this one opening 218, the sleeve 216 is solid and the doors 220 and 222 will assure automatic elimination of any stones, rocks, lumps or lumps of frozen material which sometimes occurs when spreading sand or salt during low temperature weather.

Figure 16:
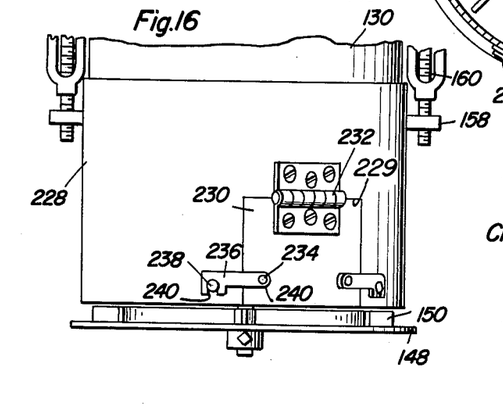
FIGURE 16 is a partial side elevation of another form of the material spreader illustrating another type of lump eliminator and illustrating latch mechanisms for rendering the lump eliminator ineffective.

Referring now specifically to FIGURE 16, another modified form of control sleeve is illustrated and is designated by the numeral 228 and the control sleeve 228 is associated with the remainder of the structure in the same manner with the same reference numerals being given to the remainder of the structure.

The control sleeve 228 is rigid also except for an opening 229 which extends upwardly from the bottom edge of the sleeve 228 and which is provided with an arcuate door 230 which has the same curvature as the cylindrical sleeve 228 and is flush with the sleeve 228 when the door 230 is closed. The door 230 is supported along its top edge by a hinge 232 for permitting outward swinging movement of the door. The hinge 232 is of the spring hinge type which will spring bias the door 230 to a vertical closed position but which will permit the door to swing outwardly when a lump, stone or the like is engaged by the spinner plate 148 and the ribs 150 thereon.

The door 230 is provided with pivot pins 234 on which are pivoted latch elements 236 that engage projecting pins 238 rigid with the cylindrical sleeve 228. The latch 236 is provided with a downwardly opening notch 240 for receiving the pin 238 whereby the latch may lock the door 230 in closed position. The latch 236 is manually operated and held in position by gravity and in this form of the invention, the driver or operator of the vehicle would have to get out of the truck and manually release the latches in order to allow for elimination of frozen lumps or stones.

Referring now specifically to FIGURE 17, there is disclosed in this figure a modified form of spinner plate that is designated by the numeral 242 which is in the form of a circular plate having an upstanding flange 244 on the periphery thereof together with the usual radial ribs 246. It is to be noted that the flange 244 is concentrically spaced from the lower end of the control sleeve 156 and the lower end of the control sleeve 156 is adjustably disposed in relation to the spinner plate 242 thereby providing a discharge path from the sleeve 156 outwardly against the flange 244 and then upwardly over the top edge of the flange 244.

The purpose of this particular construction shown in FIGURE 17 is to reduce the quantity of material spread and at the same time be able to get rid of lumps and small stones especially when spreading rather expensive material such as salt. The problem of getting the maximum spread of salt per pound is readily solved with this form of the invention. This arrangement requires that the salt travel a more difficult path and will also require that the spinner develop sufficient centrifugal force to overcome the force of gravity so that the salt will ride up over the flange 244 which will occur due to the fluid qualities of the salt and the tendency of salt to flow.

In the several forms of the invention disclosed, the spreader will effectively spread the material at a predetermined rate over a predetermined path and both the rate of discharge may be controlled and the path of discharge or the area covered by the discharge material may be varied or controlled. In one form of the invention, the hopper or housing of the spreader will automatically be filled due to dumping of the dumpable vehicle body. In the other major form of the invention, the hopper or spreader housing is automatically filled by a blade assembly which pushes the material into one corner of the vehicle body with this one corner having the spreader depending therefrom for assuring a constant supply of material to the spreader as long as there is material in the vehicle body.

Both manual and hydraulic means is provided for raising and lowering the control sleeve in relation to the spinner plate and both manually and automatically operated lump eliminator mechanism is disclosed in the several forms of the invention. Also, the various structural features in the various forms of the invention all have been simplified but still effectively spread material with the device requiring a minimum of upkeep and maintenance.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In a material spreader having a rotatable spreader plate, a control sleeve slidably adjustably mounted on a tubular housing for movement towards and away from the spreader plate, said sleeve including a plurality of swingable closure doors yieldably openable and forming a closure for at least a portion of the lower end of the control sleeve whereby the closure doors may be opened by forces exerted by large lumps, stones or the like being thrown centrifugally thereby eliminating such articles from the material spreader so that they will not decrease the effective distribution of materials.

2. A material spreader adapted to be connected to a load carrying mobile body comprising a tubular housing, a rotatable spreader plate underlying the housing in vertical alignment therewith, and a sleeve adjustably mounted on the housing with the sleeve having a lower end disposed closely adjacent the spreader plate, and means adjustably interconnecting the sleeve and the housing for adjusting the sleeve for controlling the rate of discharge of material during rotation of the rotary plate, said sleeve being provided with at least one opening in the bottom edge thereof, a pivotal closure in the opening, and means supporting the pivotal closure on the sleeve for normally urging the pivotal closure to a closed position thereby permitting elimination of lumps, stones and the like.

3. A material spreaded adapted to be connected to a load carrying mobile body comprising a tubular housing, a rotatable spreader plate underlying the housing in vertical alignment therewith, and a sleeve adjustably mounted on the housing with the sleeve having a lower end disposed closely adjacent the spreader plate, and means adjustably interconnecting the sleeve and the housing for adjusting the sleeve for controlling the rate of discharge of material during rotation of the rotary plate, said sleeve being provided with a plurality of segmental gates hingedly supported by a sping hinge with the gates forming at least a portion of the lower portion of the sleeve.

4. A material spreader adapted to be connected to a load carrying mobile body comprising a tubular housing, a rotatable spreader plate underlying the housing in vertical alignment therewith, and a sleeve adjustably mounted on the housing with the sleeve having a lower end disposed closely adjacent the spreader plate, and means adjustably interconnecting the sleeve and the housing for adjusting the sleeve for controlling the rate of discharge of material during rotation of the rotary plate, said means interconnecting the sleeve and the housing including a hydraulically operated piston and cylinder arrangement controllable from a remote position.

5. In combination with a load carrying body having an aperture in one corner of the floor thereof, a spreader assembly supported from the body in alignment with the aperture for receiving material from the body, means mounted in the body for moving the material in the body towards the corner having the aperture therein, said spreader assembly including a tubular housing, a rotatably driven spreader plate mounted at the lower end of the housing, and adjustable sleeve means mounted on the housing for adjusting the space between the sleeve means and the rotatable plate, said means for moving material toward the apertures including a pusher blade assembly, a pair of piston and cylinder arrangements attached to the pusher blade assembly for reciprocating the pusher blade assembly, said pusher blade assembly including a plurality of parallel forwardly inclined blades disposed transversely in an inclined manner for forcing the material to said one corner of the load carrying body.

6. In combination with a load carrying body having an aperture in one corner of the floor thereof, a spreader assembly supported from the body in alignment with the aperture for receiving material from the body, means mounted in the body for moving the material in the body towards the corner having the aperture therein, said spreader assembly including a tubular housing, a rotatably driven spreader plate mounted at the lower end of the housing, and adjustable sleeve means mounted on the housing for adjusting the space between the sleeve means and the rotatable plate, said tubular housing being suspended movably from a sleeve rigidly fixed to the load carrying body, spring means vertically suspending and yieldably supporting the tubular housing from said fixed sleeve for determining the weight of the tubular housing and the material disposed therein.

7. The combination of claim 6 together with a switch operable in response to upward movement and emptying of the tubular housing for closing a switch for automatically operating the material moving means for replenishing the supply of material in the tubular housing when the supply of material therein is approximately exhausted.

References Cited in the file of this patent

UNITED STATES PATENTS

| 255,668 | Pratt | Mar. 28, 1882 |
| 921,101 | Griswold | May 11, 1909 |
| 1,724,876 | Holbeck | Aug. 13, 1929 |
| 1,764,108 | Kennedy | June 17, 1930 |
| 1,938,669 | Smith | Dec. 12, 1933 |
| 2,057,759 | Bissell | Oct. 20, 1936 |
| 2,135,665 | Hoban | Nov. 8, 1938 |
| 2,442,743 | Wester | June 1, 1948 |
| 2,969,987 | De Biasi | Jan. 31, 1961 |

FOREIGN PATENTS

| 518,225 | Belgium | Mar. 31, 1953 |
| 794,478 | Great Britain | May 7, 1958 |